Patented July 31, 1945

2,380,429

UNITED STATES PATENT OFFICE 2,380,429

STABILIZATION OF ZEIN SOLUTIONS

Hugh J. Hagemeyer, Jr., Kingsport, Tenn., assignor to Eastman Kodak Company, Rochester, N. Y., a corporation of New Jersey No Drawing. Application September 14, 1943,
Serial No. 502,320

3 Claims. (Cl. 106—153)

This invention relates to a stabilization of solutions of zein in aqueous acetone or aqueous alcohol by incorporating therein a small proportion of carbon disulfide.

Zein, the protein derived from corn, is unique among the commercially available proteins by virtue of the fact that it is soluble in many organic solvents. This makes it especially valuable for many purposes. In spite of the desirable properties of zein and the large amount which is commercially available, that protein has never found wide application. This is thought to be due to the fact that zein solutions gradually increase in viscosity until a gel is formed. This change usually takes place within 24 to 48 hours and therefore, unless the solution is to be employed within a short time, it becomes unsuitable for use. In most cases the zein solutions are filtered and also there may be various other processing steps before use such as mixing with added ingredients. By the time these operations are complete, the zein often has begun to gel and the solutions are of no value.

One object of my invention is to provide a method of reducing the tendency of zein solutions to gel so as to make possible their storage for as much as 5 to 10 days without undergoing an appreciable change in viscosity. Other objects of my invention will appear herein.

I have found that incorporating a small proportion of carbon disulfide in the zein solution retards the characteristic of that solution to increase in viscosity and therefore the solution may be allowed to stand for 4 to 10 days without any appreciable increase in viscosity. My invention is particularly applicable to solutions of zein in aqueous lower aliphatic ketones or aqueous monohydroxy lower aliphatic alcohols particularly where the ketone or alcohol constitutes 85–90% of the solvent. For example, a mixture of 85 parts of acetone and 15 parts of water is an excellent solvent for zein forming a clear low viscosity solution or dope. This solution, however, will gel in about 48 hours without the presence of a stabilizing agent therein. Instead of a ketone, an alcohol such as methyl, ethyl or isopropyl alcohol might be employed as the solvent for the zein and the same phenomenon occurs.

Ordinarily it is only necessary to incorporate an amount of carbon disulfide 1–10% of the weight of the zein, usually a concentration of 2–5% will give the desired stability. As a rule, the stability increases with the increase of concentration of carbon disulfide and, therefore, to obtain good stability at least 1% is desirable. In cases, however, where the individual operator is satisfied with a partial retarding of the gelling action of the zein solution, a proportion less than 1% might be employed. A proportion of carbon disulfide greater than 10% might be employed but the additional proportion serves no useful purpose and is wasteful of carbon disulfide.

The best results in stabilizing the zein solutions have been obtained by partial warming of the solution after adding the carbon disulfide. Temperatures up to 80° C. may be employed although temperatures within the range of 50–60° C. have been found to produce the desired effect. Usually it is desirable to continue the heating for 1–15 minutes although merely heating up to the desired temperature has been found to be sufficient in numerous cases. Improvement of stabilization has also been obtained by autoclaving the solution at 80–150° C. for short periods of time such as 1 to 15 minutes. Instead of an autoclave, other means such as refluxing may be employed to prevent the escape of solvent when heating at the higher temperatures. The following examples illustrate my invention.

Example 1

A solution was prepared having the following composition:

| | |
|---|---|
| Acetone | cubic centimeters 125 |
| Water | do 35 |
| Zein | grams 50 |
| Carbon disulfide | do 2 |

This solution stood for 6 days without any appreciable increase in viscosity. A solution of the same composition, omitting the carbon disulfide, was found to gel in 24 hours.

Example 2

A solution was prepared as in the preceding example except that 1 gram of carbon disulfide was employed instead of 2. The solution was autoclaved for 5 minutes at 120° C. The solution stood for 10 days without evidencing any change in viscosity.

Example 3

A solution was prepared having the following composition:

| | |
|---|---|
| Ethyl alcohol | cubic centimeters 142 |
| Water | do 8 |
| Zein | grams 50 |
| Carbon disulfide | do 2 |

Upon standing for 7 days the solution was found to still be a thin dope.

*Example 4*

A solution was prepared having the following composition:

| | | |
|---|---|---|
| Ethyl alcohol | cubic centimeters | 142 |
| Water | do | 8 |
| Zein | grams | 60 |
| Carbon disulfide | do | 3 |

The solution was warmed to 50° C. It was then set aside for 12 days and was found to still be of low viscosity at the end of that time.

*Example 5*

A solution was made up as specified in the preceding example and this solution was autoclaved at 120° C. for 5 minutes. The solution was allowed to stand for 10 days and was found to still be of low viscosity liquid.

Zein solutions, in accordance with my invention, may be mixed with plasticizers, pigments, dyes, filling materials or colloidal materials which are added to improve or alter the characteristics of the solution. The solutions in accordance with my invention are adapted to the preparation of fibers or for coating surfaces therewith.

I claim:

1. A solution of zein in a mixture of water and a water-miscible solvent selected from the grouping consisting of methyl alcohol, ethyl alcohol, isopropyl alcohol and acetone, containing therein carbon disulfide in an amount sufficient to retard increase of viscosity of the zein solution upon standing.

2. A solution of zein in aqueous acetone containing therein 2 to 5% of carbon disulfide based on the weight of the zein.

3. A solution of zein in aqueous alcohol containing therein 2 to 5% of carbon disulfide based on the weight of the zein.

HUGH J. HAGEMEYER, Jr.